United States Patent
Ikegaya et al.

(10) Patent No.: US 9,631,635 B2
(45) Date of Patent: Apr. 25, 2017

(54) BLADES FOR AXIAL FLOW COMPRESSOR AND METHOD FOR MANUFACTURING SAME

(71) Applicant: KAWASAKI JUKOGYO KABUSHIKI KAISHA, Kobe-shi, Hyogo (JP)

(72) Inventors: Tomoaki Ikegaya, Kobe (JP); Daisuke Hayashi, Kobe (JP); Makoto Gouda, Himeji (JP); Yuji Matsuzaki, Kobe (JP); Kei Shimada, Yasugi (JP); Katsumi Ikeda, Yasugi (JP)

(73) Assignee: KAWASAKI JUKOGYO KABUSHIKI KAISHA, Kobe-Shi, Hyogo (JP)

( * ) Notice: Subject to any disclaimer, the term of this patent is extended or adjusted under 35 U.S.C. 154(b) by 331 days.

(21) Appl. No.: 14/373,796

(22) PCT Filed: Jan. 21, 2013

(86) PCT No.: PCT/JP2013/051056
§ 371 (c)(1),
(2) Date: Jul. 22, 2014

(87) PCT Pub. No.: WO2013/111694
PCT Pub. Date: Aug. 1, 2013

(65) Prior Publication Data
US 2015/0037163 A1    Feb. 5, 2015

(30) Foreign Application Priority Data
Jan. 23, 2012  (JP) ................................ 2012-010672

(51) Int. Cl.
*F04D 29/38* (2006.01)
*F04D 29/32* (2006.01)
(Continued)

(52) U.S. Cl.
CPC .............. *F04D 29/388* (2013.01); *B22F 3/12* (2013.01); *B22F 7/06* (2013.01); *F01D 5/14* (2013.01);
(Continued)

(58) Field of Classification Search
CPC .... F04D 29/388; F04D 29/542; F04D 29/023; F04D 29/324; F01D 9/041; F01D 5/14;
(Continued)

(56) References Cited

U.S. PATENT DOCUMENTS 5,634,189 A    5/1997 Rossmann et al.
6,827,556 B2   12/2004 Simon
(Continued)

FOREIGN PATENT DOCUMENTS

CA    2588626 A1 *  11/2008  .............. B22F 3/225
CN    1449470 A     10/2003
(Continued)

OTHER PUBLICATIONS

Communication dated Oct. 20, 2015 from the State Intellectual Property Office of the People's Republic of China in counterpart application No. 201380006013.3.
(Continued)

*Primary Examiner* — Richard Edgar
*Assistant Examiner* — Brian P Wolcott
(74) *Attorney, Agent, or Firm* — Sughrue Mion, PLLC

(57) ABSTRACT

An axial flow compressor blade unit including a platform section and an airfoil section, which are used as arranged on a circumference about an axis of the compressor. The platform section includes an inner diametric surface segment inwardly of the circumference, an outer diametric surface segment outwardly of the circumference, two annular side surface segments extending in a circumferential direction, two axially side surface segments extending in the axial
(Continued)

direction, and a coupling portion formed in each of the annular side surface segments so as to extend in the circumferential direction and being of a shape projecting or recessed in the axial direction. The airfoil section is formed to erect from the platform section so as to extend in a radial direction. The platform section and the airfoil section are formed integrally with each other while having a powdered metal sintered structure.

4 Claims, 2 Drawing Sheets

(51) Int. Cl.

| | | |
|---|---|---|
| F04D 29/54 | (2006.01) | |
| F04D 29/02 | (2006.01) | |
| F01D 9/04 | (2006.01) | |
| F01D 5/14 | (2006.01) | |
| B22F 7/06 | (2006.01) | |
| B22F 3/12 | (2006.01) | |
| B22F 5/04 | (2006.01) | |

(52) U.S. Cl.
CPC ........... *F01D 9/041* (2013.01); *F04D 29/023* (2013.01); *F04D 29/324* (2013.01); *F04D 29/542* (2013.01); *B22F 5/04* (2013.01); *F05D 2230/22* (2013.01); *F05D 2230/42* (2013.01); *F05D 2240/80* (2013.01); *F05D 2300/605* (2013.01); *Y02T 50/671* (2013.01); *Y02T 50/673* (2013.01)

(58) Field of Classification Search
CPC ...... B22F 7/06; B22F 3/12; B22F 5/04; F05D 2230/42; F05D 2300/605; F05D 2240/80; F05D 2230/22
See application file for complete search history.

(56) References Cited

U.S. PATENT DOCUMENTS

| | | |
|---|---|---|
| 7,775,772 B2 | 8/2010 | Carrier et al. |
| 7,854,583 B2 | 12/2010 | Wichmann et al. |
| 8,317,468 B2 | 11/2012 | Vedsted et al. |
| 2003/0185685 A1 | 10/2003 | Simon |
| 2007/0104585 A1 | 5/2007 | Ochiai et al. |
| 2007/0184298 A1 | 8/2007 | Ochiai et al. |
| 2008/0107532 A1 | 5/2008 | Carrier et al. |
| 2009/0041580 A1 | 2/2009 | Wichmann et al. |
| 2010/0008775 A1 | 1/2010 | Vedsted et al. |
| 2011/0044800 A1 | 2/2011 | Cornelius et al. |
| 2011/0052397 A1 | 3/2011 | Kusters et al. |
| 2012/0057986 A1 | 3/2012 | Inoue et al. |
| 2012/0114956 A1 | 5/2012 | Ochiai et al. |

FOREIGN PATENT DOCUMENTS

| | | | |
|---|---|---|---|
| CN | 101624998 A | 1/2010 | |
| DE | WO 2005008032 A1 * | 1/2005 | ............ B22F 3/225 |
| JP | 08-120307 A | 5/1996 | |
| JP | 2004-508478 A | 3/2004 | |
| JP | 2008-138669 A | 6/2008 | |
| JP | 2009-041563 A | 2/2009 | |
| JP | 2010270645 A | 12/2010 | |
| WO | 02/20948 A1 | 3/2002 | |
| WO | 2004/111394 A1 | 12/2004 | |
| WO | 2005008032 A1 | 1/2005 | |
| WO | 2006/015899 A1 | 2/2006 | |
| WO | 2010/137610 A1 | 12/2010 | |

OTHER PUBLICATIONS

Communication dated Sep. 17, 2015 from the European Patent Office in counterpart application No. 13741504.8.
Communication dated Nov. 12, 2015 from the Canadian Intellectual Property Office in counterpart application No. 2,861,476.
International Preliminary Report on Patentability dated Aug. 7, 2014, from the International Searching Authority in counterpart International Application No. PCT/JP2013/051056.
International Search Report for PCT/JP2013/051056 dated Apr. 23, 2014 [PCT/ISA/210].
Summary of Notification of Reason(s) for Rejection on Corresponding JP 2012-010672, dated Apr. 16, 2013.
Summary of Decision of Rejection on Corresponding JP 2012-010672, dated Nov. 26, 2013.
Decision of Grant on Corresponding JP 2012-010672, dated May 20, 2014.
Communication dated Jun. 13, 2016, from the State Intellectual Property Office of the P.R.C., in counterpart Chinese application No. 201380006013.3.

* cited by examiner

BLADES FOR AXIAL FLOW COMPRESSOR AND METHOD FOR MANUFACTURING SAME

CROSS REFERENCE TO THE RELATED APPLICATION

This application is based on and claims Convention priority to Japanese patent application No. 2012-010672, filed Jan. 23, 2012, the entire disclosure of which is herein incorporated by reference as a part of this application.

BACKGROUND OF THE INVENTION

Field of the Invention

The present invention relates to blades and vanes for an axial flow compressor used in mechanical equipments such as, for example, gas turbine engine, and a method of manufacturing the blades and vanes.

Description of Related Art

The axial flow compressor is operable to continuously compress a gaseous medium with the utilization of the pressure difference developed between upstream and downstream sides of a rotating blade and a static vane. As compared with a centrifugal compressor designed to accomplish the same object, the axial flow compressor can handle the large flow rate, can be downsized to have a small diameter, and can be expected to exhibit the performance with high compressibility rate and high efficiency. On the other hand, the axial flow compressor is complicated in mechanical structure and makes use of a number of component parts and is hence necessarily expensive. Such an axial flow compressor is employed in various applications, for example, an aircraft gas turbine engine (jet engine), a gas turbine engine for a high speed marine vessel or an electric generator, a gas-flow separating device, a dust collector, a vacuum pump, a wind tunnel, a propane (natural gas) oxidative dehydrogenization device, a pipeline gas compressor and so on.

In the axial flow compressor of a relatively large size such as, for example, the gas turbine engine, an axial flow compressor blade unit such as a rotating blade (rotor), which is rotatable at a high speed, and/or a static vane (stator), which does not rotate, is employed. The axial flow compressor blade unit is generally comprised of an airfoil section and a platform section. In these blade component parts, the airfoil section has an aerodynamic shape, which is exclusively designed to meet with the complicated geometrical requirements, and the platform section has couplings required to be fitted to a rotary disk or shaft and a casing, and the axial flow compressor blade is in general designed and configured to have a complicated shape. Accordingly, the patent document 1 listed below discloses the manufacture of such blade components, in which they are first forged or cast to have a basic blade component shape and then go through various machining processing steps to make the blade components to have final blade component shapes and sizes. Also, the patent document 2 listed blow discloses a method of shaping the airfoil section with the use of a five axis milling machine or a precision forging.

PRIOR ART LITERATURE

Patent Document 1: WO2004/111394
Patent Document 2: WO2006/015899

The prior art technique disclosed in any one of the patent documents 1 and 2 referred to above makes use of many mechanical procedures and a mechanical process occupies an extremely large proportion of the entire manufacturing process from the start of manufacture to the final product of the axial flow compressor blade unit. Accordingly, reduction of the manufacturing time of the axial flow compressor blade unit and improvement of the yield of material therefore are hampered and it has been recognized a factor that increase of the productivity and reduction in manufacturing cost are neither advanced.

SUMMARY OF THE INVENTION

In view of the foregoing, the present invention has for its primary object to provide an inexpensive axial flow compressor blade unit and a method of manufacture of such axial flow compressor blade unit, which are high in productivity, and which have reached as a result of studies conducted to provide a method of making the axial flow compressor blade unit that can contribute to the reduction of the manufacturing cost.

The inventors of the invention herein set forth conducted a series of studies on the applicability of a metal injection molding method, which had not yet been practiced in the industry pertinent to the present invention, to the axial flow compressor blade unit that is required to have a specific shape including a platform section and an airfoil section and has now reached the present invention as the latter is found to be effective to solve the above discussed problems and inconveniences.

The axial flow compressor blade unit of the present invention is an axial flow compressor blade unit including a platform section and an airfoil section, which is arranged on a circumference about an axis of the compressor. The platform section in turn includes an inner diametric surface segment inwardly of the circumference, an outer diametric surface segment outwardly of the circumference, two annular side surface segments extending in a circumferential direction, two axially side surface segments extending in the axial direction, and a coupling portion formed in each of the annular side surface segment so as to extend in the circumferential direction, the coupling portion being of a shape projecting or recessed in the axial direction. On the other hand, the airfoil section is formed to erect from the platform section so as to extend in a radial direction. The platform section and the airfoil section are formed integrally with each other while having a powdered metal sintered structure.

In the axial flow compressor blade unit of the structure designed in accordance with the present invention as above, the powdered metal sintered structure of the airfoil section preferably has a relative density of 95% or higher and an average grain size within the range of 10 to 100 µm. Also, the axial flow compressor blade unit of the present invention may be applied to, for example, a stator vane unit for a gas turbine.

The present invention in accordance with another aspect thereof provides a method of manufacturing an axial flow compressor blade unit including a platform section and an airfoil section which is arranged on a circumference about an axis of the compressor. This method includes a green body forming step and a sintered body forming step relying on a metal injection molding. During the practice of the green body forming step, a green body including a platform shaped portion corresponding to the platform section and an airfoil shaped portion corresponding to the airfoil section are formed, which airfoil section comprises an inner diametric surface segment inwardly of the circumference, an outer diametric surface segment outwardly of the circumference, two annular side surface segments extending in a circumferential direction, two axially side surface segments extending in the axial direction, and a coupling portion formed in each of the annular side surface segment so as to extend in the circumferential direction, the coupling portion being of a shape projecting or recessed in the axial direction. On the other hand, during the sintered body forming step, a powdered metal forming the green body is sintered to form a powdery metal sintered body having a shape corresponding to the axial flow compressor blade. Thereby, the axial flow compressor blade unit including the platform section and the airfoil section formed integrally with each other and having a powdered metal sintered structure is formed.

In the practice of the axial flow compressor blade unit manufacturing method described above, the powdered metal sintered structure of the airfoil section preferably has a relative density of 95% or higher and an average grain size within the range of 10 to 100 μm. Also, the axial flow compressor blade unit referred to above can be applied to a stator vane unit for a gas turbine.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF PREFERRED EMBODIMENTS

The axial flow compressor blade designed in accordance with the present invention has an important technical feature that lies in, in the practice of the manufacture of the axial flow compressor blade unit which includes a platform section and an airfoil section and requires specific shapes, the utilization of the metal injection molding method to form a powdered metal sintered body having a shape corresponding to the axial flow compressor blade unit defining the final product. According to the important technical features, the powdered metal sintered body having a shape approximate to that of the final product can be obtained directly from a powdered metal, which is a raw material, and as a result, the proportion, which the mechanical processing occupies in the entire manufacturing process of making the axial flow compressor blade unit, can be reduced. Subsequent thereto, if required, a machining processing, for example, required to finish the obtained powdered metal sintered body so as to have a required dimensional accuracy is performed so that the axial flow compressor blade unit having the platform section and the airfoil section can be obtained.

A preferred embodiment of the present invention will now be described with reference to the accompanying drawings.

Figure 1:
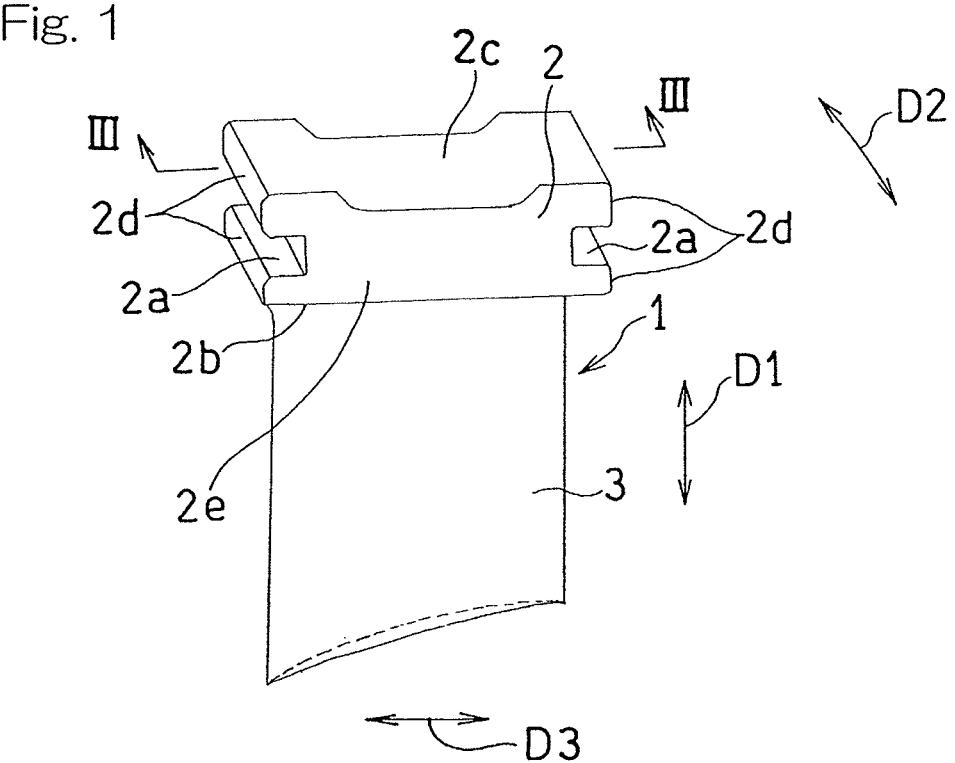
FIG. 1 is a perspective view showing an axial flow compressor blade unit designed in accordance with a preferred embodiment of the present invention.
Figure 2:
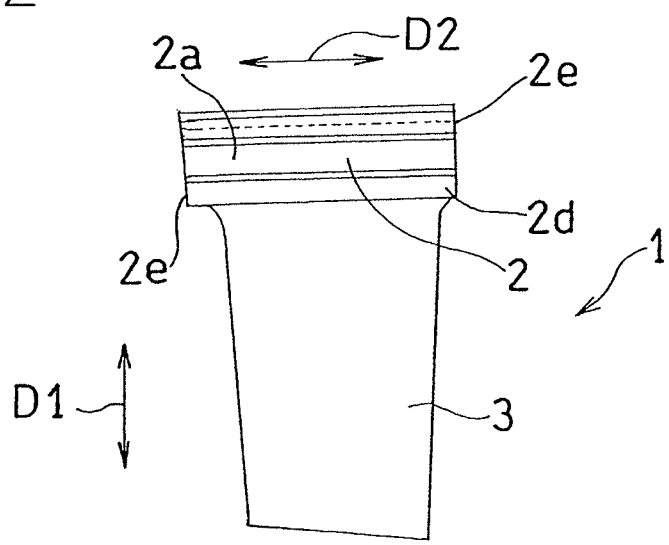
FIG. 2 is a side view of the axial flow compressor blade unit shown in FIG. 1.
Figure 3:
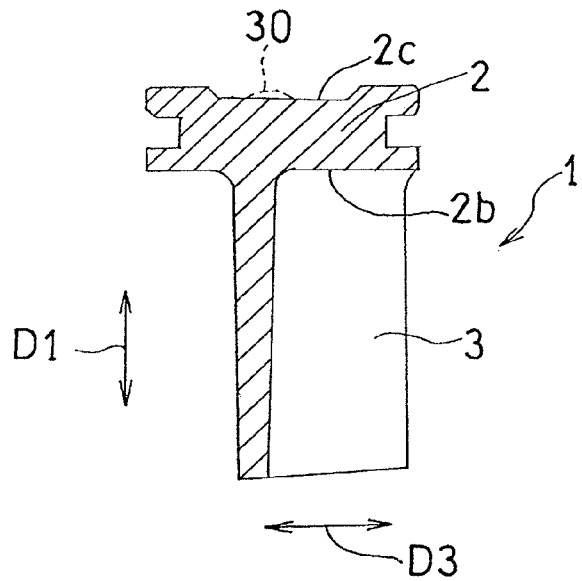
FIG. 3 is a cross sectional view taken along the line III-III in FIG. 1 showing the axial flow compressor blade unit.

FIG. 1 is a perspective view showing the preferred embodiment of the axial flow compressor blade unit to which the present invention pertains. The axial flow compressor blade unit 1 shown in FIG. 1 includes a platform section 2, adapted to be secured to a support member (not shown) such as, for example, a housing of a compressor, and an airfoil section 3 erected to protrude from one surface of the platform section 2. Where the airfoil section 3 is erected so as to extend in a direction parallel to a radial direction D1 of the axial flow compressor, the airfoil section 3 and that one surface of the platform section 2 are exposed to a gaseous medium flowing within the compressor.

Where the axial flow compressor blade unit 1 is used as, for example, a gas turbine stator vane unit, a plurality of axial flow compressor blade units 1 are arranged in a circumference about a longitudinal axis of the compressor with that one surface of each of the platform sections 2 positioned inwardly of the radial direction D1. By so doing, each of the airfoil sections 3 has an aerodynamic shape defined by a combination of geometrically complicated curved surfaces. In this case, each of the platform sections 2 has an inner diametric surface segment 2b (that one surface referred to above) inwardly of the circumference with an inner diametric surface facing radially inwardly, an outer diametric surface segment 2c outwardly of the circumference with an outer diametric surface facing radially outwardly. The platform section 2 also has two annular side surface segments 2d extending in a circumferential direction D2, and two axial side surface segments 2e extending in an axial direction D3 parallel to the longitudinal axis of the compressor.

The annular side surface segments 2d have opposite end faces facing in respective directions parallel to the axial direction D3, and each of the annular side surface segments 2d has a coupling portion 2a in the form of a circumferential groove recessed inwardly in the axial direction D3 and extending in the circumferential direction D2. This coupling portion 2a is adapted to allow the platform section 2 to be engaged with a support member such as, for example, the housing to support the axial flow compressor blade unit 1. It is to be noted that the coupling portion 2a may not necessarily be a circumferentially groove such as shown and described, but may be a projection extending circumferentially and protruding in the axial direction D3.

The axial flow compressor blade unit 1 is of a structure in which the platform section 2 and the airfoil section 3 are integrally formed with each other, having a powdered metal sintered structure. The metal injection molding (MIM: Metal Injection Molding) is capable of providing a powdered metal sintered body having a shape approximate to the shape of the final product directly from a powdered metal used as a raw material. Accordingly, by employing a construction having the powdered metal sintered structure in which the platform section 2 and the airfoil section 3 are formed integrally with each other, the metal injection molding can be suitably employed as a method of manufacturing the axial flow compressor blade. Thereby, since at least up to the procurement of the powdered metal sintered body, implementation of a mechanical processing that may result in reduction of productivity and material yield is eliminated, the proportion of the mechanical processing in the entire manufacturing process can be extremely reduced. Thereafter, by means of applying a mechanical processing to the powdered metal sintered body if so required, specifically by finishing the coupling portion 2a, for example, to the required dimensional accuracy, the axial flow compressor blade unit 1 having the platform section 2 and the airfoil section 3 can be obtained.

The axial flow compressor blade unit 1, in which the platform section 2 and the airfoil section 3 are formed integrally while having the powdered metal sintered structure, can be manufactured by the utilization of the method of making the axial flow compressor blade unit according to the preferred embodiment. Specifically, the method of making the axial flow compressor blade unit includes a green body forming step and a sintered body forming step according to the metal injection molding method. During the green body forming step, a green body is formed which has a platform shaped portion, corresponding to the platform section 2, and an airfoil shaped portion, which corresponds to the airfoil section 3 and upstands from the platform section 2 so as to extend in the radial direction D1. During the sintered body forming step, a powdered metal defining the green body is sintered to provide the powdered metal sintered body having a shape corresponding to the shape of the axial flow compressor blade unit 1.

The axial flow compressor blade unit, to which the above described manufacturing method is particularly suitably applied, is such that, for example, the platform section is of a size in which the length and width dimension of each of the outer and inner diametric surface segments thereof is not greater than 50 mm and the thickness (as measured in the radial direction of the axial flow compressor) corresponding to one side of each of the axial and annular side surface segments is equal or not greater than 15 mm, whereas the airfoil section is such that the height thereof from the platform section is equal or not greater than 50 mm, the airfoil width is not greater than 50 mm and the maximum portion of the airfoil thickness is not greater than 5 mm. Since such a relatively small axial flow compressor blade unit is extremely difficult to manufacture highly precisely with any known casting or forging technique, the application of the metal injection molding (MIM) is particularly effective in that the shape approximate to the shape of the final product can be formed directly. It is to be noted that, when it comes to the axial flow compressor blade of a size exceeding the above described dimensions, the metal injection molding is still applicable, but the use of a large sized injection molding machine capable of accommodating a substantially large mold assembly and capable of accomplishing a high pressure injection is required. Therefore, the productivity and the manufacturing cost would be affected such as, for example, lengthening of the injection molding cycle and/or increased requirement of capital investments.

Figure 4:
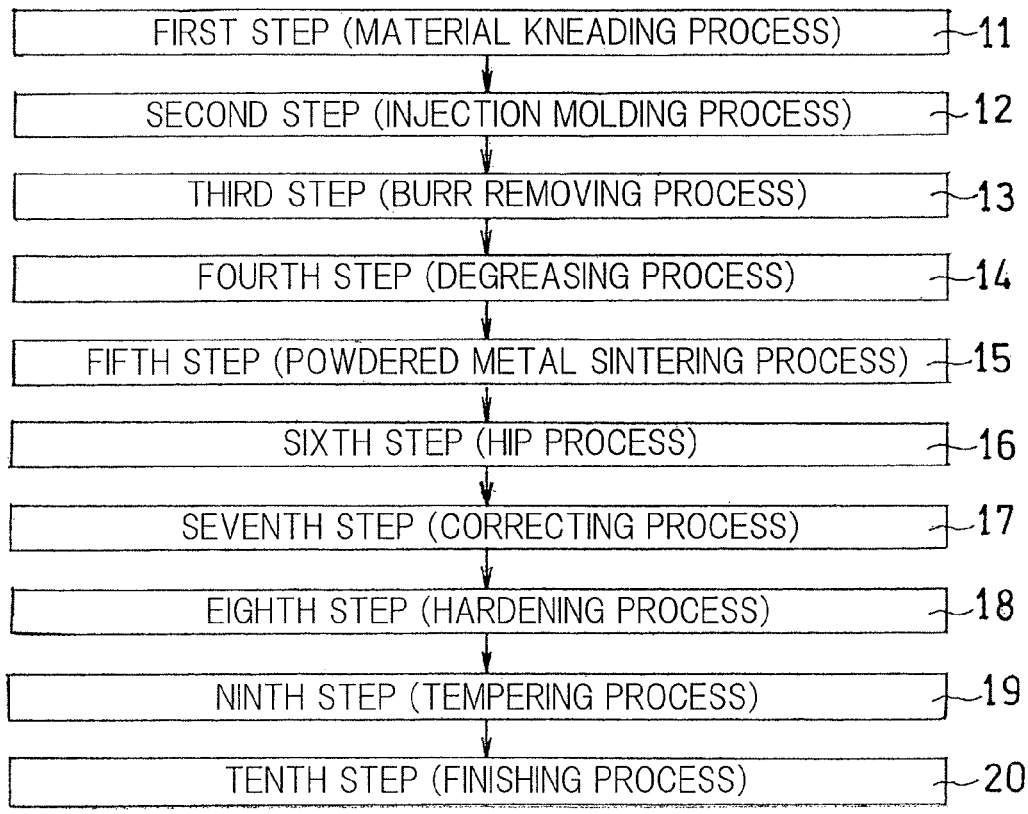
FIG. 4 is a flowchart showing a preferred manufacturing process of a method of manufacturing the axial flow compressor blade unit according to the present invention.

Hereinafter, the method of manufacturing the axial flow compressor blade unit of the type discussed above will be described with particular reference to FIG. 4 showing a flowchart of one example of the method of manufacturing the axial flow compressor blade unit 1.

The axial flow compressor blade unit 1 can be manufactured by the use of the manufacturing process including, as principal manufacturing steps, the green body forming step and the sintered body forming step, which pertain to the metal injection molding method, and, more particularly, by the use of, for example, the manufacturing process including first to tenth steps shown in FIG. 4. It is to be noted that steps directly relates to the metal injection molding method are the first to fifth steps. Each of those manufacturing steps will be described.

[First Step]

The first step is a material kneading step 11, in which a mixture of a powdered metal and a binder is sufficiently kneaded by the use of a kneading machine to provide a feedstock suited to the metal injection molding. The powdered metal referred to above can be employed in the form of a metal powder of a stainless alloy such as a Fe-based powdery alloy of, for example, Fe—Cr—Co system or Fe—Cr—Ni system. Also, the binder referred to above may include a wax and polymeric resins. For the wax, paraffin wax or carnauba wax can be suitably employed. On the other hand, for the polymeric resins, one or a mixture of polyethylene, polypropylene, acrylic resins, EVA (ethylene-vinyl acetate copolymeric resin) and styrene rubbers can be selected. The molding material referred to above may contain one or more additives if so required.

The powdered metal, if prepared to have the particle size as small as possible, is considered having a good sintering capability and, therefore, in order to increase the density of the powdered metal sintered body, the use of the powdered metal having the particle size as small as possible is particularly effective. However, the powdered metal suited for use in the metal injection molding tends to become expensive as it is prepared in the form of a minute powder, and, therefore, the use of the powdered metal of 5 to 15 μm in average particle size is preferred in the practice.

Also, regarding the preparation of the feedstock, the "powdered metal" versus the "total amount of the binders and others" is preferably chosen to be "50 to 65 volume %" versus "50 to 35 volume %", and "waxes" versus "polymeric resins", both contained in the "total amount of the binder and others" is preferably chosen to be "40 to 65 volume %" versus "60 to 35 volume %". In a specific example, the feedstock can be utilized, in which the powdered metal, comprised of the Fe based alloy (added principal elements of which include Cr in a quantity of 10.6 mass %, Co in a quantity of 5.8 mass %, Mo in a quantity of 0.8 mass % and Ni in a quantity of 0.5 mass %) of a kind having the average particle size of 8 μm, and the binder, comprised of paraffin wax, polypropylene and styrene resins, are mixed in a mass ratio of 92.5 versus 7.5. With the use of the above described feedstock containing the powdered metal, formation of the green body and the powdered metal sintered body, as will be described later, can be facilitated.

The relative density is synonymous with the relative density as defined under JIS-Z2500 and means a ratio between the factual density and the theoretical density. The factual density is obtained by dividing the mass of the powdered metal sintered body, which will become the factual body, by the volume determined from the dimensions of such factual body. The theoretical density is determined, while the powdered metal is assumed to independently exist in the sintered structure of the powdered metal sintered body, from the mixture composition of the material used with the use of stoichiometric densities. In other words, the relative density means the percentage of the factual density divided by the theoretical density.

Also, the average particle size referred to above is obtained by the use of a laser diffraction and dispersion particle distribution measuring device. Specifically, a laser beam is applied to a powdery sample suspended in a dispersed medium to generate scattered lights. Then, the scattering phenomenon of light so obtained is utilized to measure the intensity distribution of the scattered lights with the use of a plurality of optical detectors. Further, the intensity distributions of the scattered lights so measured are collected to obtain scattered light information. Such information is subject to analysis and calculation by a computer after A/D conversion to obtain the average particle size. The particle distribution is represented with a volume reference, and is outputted with the particle size taken in the axis of abscissas and the frequency or the accumulation taken in the axis of ordinates, and the particle size at 50% when accumulated is rendered to be the average particle size.

[Second Step]

The second step is an injection molding process 12 which corresponds to the green body forming step that is important in the practice of the present invention. During the injection molding process 12, with the use of an injection machine handling the metal injection molding (MIM), the feedstock obtained during the material kneading process 11 is loaded into a cavity in an injection die, which corresponds to the axial flow compressor blade unit 1, to thereby provide a green body formed with a platform shaped portion, corresponding to the platform section 2, and a vane shaped portion corresponding to the airfoil section 3. This injection molding process 12 is one of the important steps, and the dimensions and shape and an integrity of structure including a uniform dispersion of the powdered metal of the obtained green body may considerably affect the dimensions and shape, the powdered metal sintered structure and the mechanical characteristics of the finally obtained powdered metal sintered body.

It is to be noted that the cavity of the injection die referred to above is preferably formed in consideration of not only the dimensions and shape of the axial flow compressor blade unit 1, but also constriction of the obtained green body resulting from cooling down or drying, strains upon degreasing from the green body, shrinkage of the sintered body as a result of powdered metal sintering, strains occurring during the powdered metal sintering and resulting from restraint from complicated shape of the platform section 2 and the airfoil section 3 and other factors.

During the injection molding, it is preferred that the injection die is maintained at a temperature within the range of 20 to 40° C. by means of a temperature adjusting device or the like, the feedstock is maintained at a temperature within the range of 140 to 165° C. by means of, for example, a temperature adjusting function incidental to the injection molding machine, the injection pressure is within the range of 40 to 120 MPa and an injecting rate is within the range of 30 to 40 g/sec. By so doing, the powdered metal sintered structure of the axial flow compressor vane can be easily formed suitably. Also, the green body formed by the metal injection molding contains a large amount of powdered metal, and therefore, has a high heat conducting amount. Accordingly, since heat conduction towards the injection die takes place at high speed, it can be easily cooled as compared with an injection green body made of an ordinary resinous raw material. For this reason, when the green body is to be separated from the injection die, in order to avoid a deformation of the green body after separation from the injection die, it is preferred that the green body is separated from the injection die after the lapse of a necessary and sufficient cooling time within the range of 6 to 25 seconds.

[Third Step]

The third step is a burr removal process 13, during which a projection 30 corresponding to an injection port for the feedstock and a linear protruding trace (parting line), which is formed in correspondence with a mating surface of the injection die, and the like, all formed in the green body in the injection molding process 12, are mechanically removed to such an extent that the subsequent step will not be hindered. It is to be noted that where the subsequent step will not be hindered, the burr removal process 13 may be dispensed with.

[Fourth Step]

The fourth step is a degreasing process 14, in which waxes of the binder, which consists in the green body, are removed to such an extent that they will not hinder the powdery metal sintering to thereby provide the green body in which the metal powders can be bridged by the polymeric resin of the binder. As a method for removing the waxes, a solvent degreasing method or heated degreasing method is applied. In the solvent degreasing method, the waxes are immersed in a solvent capable of solving only the wax. In the heated degreasing method, a gradual heating is made to a temperature region, about at which the waxes can be melted and exuded, and then to a temperature range at which the waxes are dissolved and evaporated to thereby remove. Considering the suppression of strains and others in the green body, it is preferred that the waxes are removed in a quantity as much as possible first by means of the solvent degreasing method, followed by the heated degreasing method to remove the remaining waxes. Also, by adjusting the degreasing condition, not only the waxes, but the polymeric resin of the binder can be also removed to such an extent that the green body after the degreasing process will not be impaired and that the handling can be accomplished.

In the case of the solvent degreasing, a standard cleaning machine having a heating function can be utilized and, particularly where a highly volatile solvent is used, the use of a device of a highly airtight structure is desirable from the standpoint of environment or workshop hygiene. If the temperature of the solvent is slightly higher (for example, higher by 5 to 10° C.) than the melting point (for example, 45 to 80° C.) of the waxes contained in the feedstock, the length of time required to accomplish the degreasing can be expectedly reduced. It is, however, to be noted that in consideration of suppression of strains and softening deformation of the green body exposed to a temperature higher than the melting point of the waxes, the solvent should be used at a temperature that is agreeable to the waxes used and/or the shape and dimension of the green body. As a specific example, where the binder containing the paraffin wax having the melting point of 55° C., the polypropylene and styrene resin is used, the solvent degreasing can be performed at a temperature of 60° C. by immersing in a paraffin soluble solvent for 1 hour.

Also, in the case of the heated degreasing, an atmosphere recirculating oven or the like capable of heating to about 300° C. can be used, and the removed binder can be captured in an exhaust system. Since the above described waxes can be evaporated at a temperature region of about 120 to 150° C., it is preferred that a temperature increase from room temperature (25° C.) to about 150° C. can be accomplished at a rate of 10 to 30° C. per hour, and thus, the strain and deformation of the green body, which would result from excessive expansion of the waxes can be suppressed. As a specific example, where the binder containing the above described paraffin wax, polypropylene and styrene resin is used, under the atmosphere, it is gently heated to 175° C. in 16 hours and, by maintaining this condition for 4 hours, the paraffin wax can be removed.

[Fifth Step]

The fifth step is a powdered metal sintering process 15 which defines the core of the sintered body forming step that is important in the practice of the present invention. In this powdered metal sintering process 15, the post-degreased green body, which has been subjected to the degreasing process 14, is allowed to stand within a sintering furnace and the powdered metal forming the green body is sintered through a process of removing components other than the powdered metal, such as, for example, waxes and polymeric resin remaining within the post-degreased green body, to thereby form the powdered metal sintered body having a shape corresponding to that of the axial flow compressor vane unit 1.

This powdered metal sintering process 15 is one of the important steps and a temperature control pattern (for example, the temperature and the length of time, both retained for sintering, temperature pattern and rate for heating and cooling or the like) of the sintering furnace associated with the powdered metal sintering, and a factual temperature distribution and atmosphere within the furnace during the processing considerably affect on, for example, the dimension, the shape, powdered metal sintered structure and mechanical characteristics of the resultant powdered metal sintered body. It is to be noted that, where in the practice of the fourth step referred to above, the green body, to which the solvent degreasing process has been applied, is further subjected to a heated degreasing process, this powdered metal sintering process 15 may be carried out in continuance from the heated degreasing.

The powdered metal sintering is executed with the use of such a heating furnace as a furnace dedicated solely for sintering. In order to completely remove the binder remaining within the post-degreased green body, it is preferred that control is made by heating the furnace to a temperature range of 500 to 650° C. at a rate of 60° C. per hour, maintaining at the attained temperature for about 1.5 hours, subsequently further raising the temperature, and maintaining for about three hours at a sintering temperature range of 1320 to 1360° C. to thereby sinter the powdered metal defining the green body. In this case, the atmosphere within the furnace may be that of a reduced pressure or hydrogen gaseous during the degreasing, but may be that of a reduced pressure during the sintering of the powdered metal. As a specific example, where the powdered metal containing the Fe based alloy (the major alloying elements of which include Cr in a quantity of 10.6 mass %, Co in a quantity of 5.8 mass %, Mo in a quantity of 0.8 mass % and Ni in a quantity of 0.5 mass %) is used, the sintering process with its holding time of 2 hours at 1330° C. can be performed by raising the temperature in succession from the above described heated degreasing while the pressure is reduced.

By means of the above described powdered metal sintering process, the powdered metal sintered body of a shape corresponding to the axial flow compressor vane unit 1 and having the powdered metal sintered structure can be obtained. This powdered metal sintered body is so formed as to permit the platform section and the airfoil section to have the relative density of 90% or higher and the average particle size of 10 to 100 μm and can be used in the axial flow compressor vane having a suitable mechanical characteristic. In the powdered metal sintered structure of the axial flow compressor vane, the relative density of 97% or higher is preferred and it is expected that the toughness can be increased in a quantity corresponding to the increase of the density. Also, the average crystalline particle size is preferred to be within the range of 25 to 75 μm and, where any reduction in toughness is particularly avoided, such conditions as required to attain a small average crystalline particle size should be selected. It is, however, to be noted that if an attempt is made to secure the average crystalline particle size as small as possible, the sintering process that continue for a long time on a low temperature side of the above described temperature range is often required and, therefore, selection of the average crystalline particle size should be made in consideration of the productivity.

[Sixth Step]

The sixth step is a hot isostatic pressing (HIP) process 16 in which the hot isostatic pressing is applied to the powdered metal sintered body referred to above, but this process may be dispensed with. This hot isostatic pressing process 16 is carried out with the use of a furnace desiccated solely for the HIP process, and preferably, the interior of the furnace is held under the atmosphere full of an argon gas held at a pressure of 100 MPa, heated to a retention temperature of 1160° C. and the powdered metal sintered body is retained therein for about 3 hours. By so doing, relatively large voids inherent in the powdered metal sintered body referred to above can be assuredly collapsed and rather minute gaps and cracks can be collapsed as many as possible. As a result, the density of the powdered metal sintered body can be increased to enhance the mechanical strength and, thus, the further suitable powdered metal sintered structure can be obtained.

[Seventh Step]

The seventh step is a correcting process 17 in which the shape of the powdered metal sintered body is forcibly corrected or rectified, in the event that such powdered metal sintered body has a harmful strain, to such an extent as to render the strain to be harmless. In the case of the axial flow compressor blade unit 1, particularly the vane shaped portion corresponding to the airfoil section 3 often has strain. By way of example, in the case of correcting the vane shaped portion, when the surface hardness of such vane shaped portion is of a value that is not suited for the correction, it is preferred that annealing may be performed to render it to have a hardness suitable for correction. By so doing, it is possible to suppress generation of cracking during the correction.

Also, the actual correction of the vane shaped portion can be carried out by sandwiching a blade surface with the use of a pair of correcting jigs that are so shaped as to correspond to the shape of front and rear shapes of the blade surface of a desired vane shaped portion and then pressing the vane surface with the use of a press device such as, for example, a hydraulic press or a mechanical press. The annealing process based on the surface hardness described above and the correcting means using the press may apply to a correction of the platform shaped portion other than the vane shaped portion. It is to be noted that, where the powdered metal sintered body having no harmful strain is obtained, the correcting process 17 can be dispensed with.

[Eighth Step]

The eighth step is a hardening process 18 in which a structural morphology is adjusted by implementing a heat treatment on the obtained powdered metal sintered body through the above described powdered metal sintering process 15, the HIP process 16 and the correcting process 17, to thereby obtain a desired mechanical characteristic.

By way of example, where the powdered metal sintered body is made of the Fe based alloy of Fe—Cr—Co system, under the atmosphere of argon gas held at atmospheric pressure, the hardening process 18 is preferably conducted under conditions in which the hardening temperature is within the range of 1100 to 1200° C., the retention time of 20 to 60 minutes, and such a forced cooling as, for example, oil cooling or water cooling is used. As a specific example, where the powdered metal of the Fe based alloy (principal added elements of which include in a quantity Cr of 10.6 mass %, Co of 5.8 mass %, Mo of 0.8 mass % and Ni of 0.5 mass %) is used, the hardening process can be implemented under the atmosphere of argon gas at 1170° C. for the retention time of 0.5 hours.

It is to be noted that the conditions such as the hardening temperature and the retention time both discussed above can be suitably determined in dependence on the material, the structural morphology, the dimensions and the shape. Also, it is quite usual that this hardening process 18, when combined with a tempering process as will be described later, makes its effect developed and, depending on the material, it may be dispensed with.

[Ninth Step]

The ninth step is the tempering process 19 in which the powdered metal sintered body, which have been hardened during the hardening process 18, is tempered. By way of example, in the case where the powdered metal sintered body is made of the Fe based alloy of Fe—Cr—Co system described hereinabove, after the tempering temperature has been set to 580 to 650° C. and retained for a few hours, a process of forced cooling by means of blowing of a gaseous medium such as, for example, atmosphere is preferably implemented. As a specific example, where the powdered metal of the Fe based alloy (principal added elements of which include in a quantity Cr of 10.6 mass %, Co of 5.8 mass %, Mo of 0.8 mass % and Ni of 0.5 mass %) is used, after the above described hardening process, retention is made for 5 hours at a temperature of 610° C., and then, the tempering process is carried out, in which the forced cooling with the atmosphere may be implemented. It is preferred that this process is conducted twice.

Also, depending on the hardness and the structural morphology of the powdered metal sintered body, the tempering may be again conducted under the same conditions. Such a repetition of the tempering process is also called a two-stage tempering process. It is to be noted that the conditions such as, for example, the tempering temperature and others described hereinabove may be suitably determined depending on, for example, the material, the hardness, the structural morphology and so on of the powdered metal sintered body after the hardening process 18. Also, it is quite usual that this tempering process 19, when combined with the hardening process 18 described above, makes its effect demonstrated and, depending on the material, it may be dispensed with.

[Tenth Step]

The tenth step is a finishing process 20 in which the powdered metal sintered body is finished to a predetermined shape and a dimensional accuracy. The powdered metal sintered body having the shape corresponding to the axial flow compressor vane unit 1 is obtained through a series of the manufacturing steps, to which the above described metal injection molding method has been applied. It is quite often that in the axial flow compressor blade unit 1, a site corresponding to the coupling portion 2a through which the platform section 2 is fitted to the support member such as, for example, the housing is finished by means of a mechanical processing such as, for example, cutting or grinding. In addition, beside the coupling portion 2a, sites corresponding to two axial side surface segments 2e may also be finished. Also, a blade end of the vane shaped portion corresponding to the airfoil section 3 and a peripheral edge of the platform shaped portion may also be finished. Yet, if the correcting process 17 is not intended and is insufficient and/or a new strain is induced during the subsequent step, the correcting process may be suitably carried out with the use of the correcting jigs or manually.

Through the above described manufacturing process, the axial flow compressor blade unit 1 having the platform section 2 and the airfoil section 3, which is arranged on a circumference about a shaft axis of the compressor, can be obtained. Specifically, the axial flow compressor blade unit 1 includes the platform section 2 and the airfoil section 3. The platform section 2 has an inner diametric surface segment 2b inwardly of the circumference, an outer diametric surface segment 2c outwardly of the circumference, the two annular side surface segments 2d extending in the circumferential direction D2, the two axially side surface segments 2e extending in the axial direction D3 and the coupling portion 2a recessed in the axial direction D3 relative to the axially side surface segments 2d and extending in the circumferential direction D2. Further, the airfoil section 3 is erected from the platform section 2 in the radial direction D1. The axial flow compressor blade unit 1 can be obtained, in which the platform section 2 and the airfoil section 3 are formed integrally with each other, while having the powdered metal sintered structure. It is to be noted that the coupling portion 2a may be so formed as to protrude in the axial direction D3.

In the case of the manufacturing process shown in FIG. 4, the step in which the mechanical processing forms the core, is limited to the tenth step, and at least the first to fifth steps may be steps in which the mechanical processing does not form the core. In other words, by the time the powdered metal sintered body having the shape corresponding to the axial flow compressor blade unit 1 is obtained, the opportunity of using the mechanical processing directly can be extremely minimized. Accordingly, regarding the axial flow compressor blade required to have the shape having the platform section and the airfoil section, the proportion that the mechanical processing occupies in the entire manufacturing process of the axial flow compressor blade can be reduced. Therefore, as compared with the conventional art in which the mechanical processing is frequently used, the increase of the productivity and the reduction in manufacturing cost can be expected.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

1 . . . Axial flow compressor blade unit
2 . . . Platform section
2a . . . Coupling portion
2b . . . Inner diametric surface segment
2c . . . Outer diametric surface segment
2d . . . Annular side surface segment
2e . . . Axially side surface segment
3 . . . Airfoil section
D1 . . . Radial direction
D2 . . . Circumferential direction
D3 . . . Axial direction 11 . . . Material kneading process
12 . . . Injection molding process (Green body forming step)
13 . . . Burr removing process
14 . . . Degreasing process
15 . . . Powdered metal sintering process
16 . . . HIP process
17 . . . Correcting process
18 . . . Hardening process
19 . . . Tempering process
20 . . . Finishing process
30 . . . Projection

What is claimed is:

1. A method of manufacturing an axial flow compressor blade unit comprising a platform section and an airfoil section, the axial flow compressor blade unit arranged on a circumference about an axis of a compressor, the method comprising:
   a green body forming step, and a sintered body forming step relying on a metal injection molding, wherein:
   during the green body forming step, from a metal powder including a Fe-based powdery alloy of Fe—Cr—Co system or Fe—Cr—Ni system, a green body including a platform shaped portion corresponding to the platform section and an airfoil shaped portion corresponding to the airfoil section are formed, which airfoil section includes an inner diametric surface segment inwardly of the circumference, an outer diametric surface segment outwardly of the circumference, two annular side surface segments extending in a circumferential direction, two axially side surface segments extending in an axial direction, and a coupling portion formed in each of the annular side surface segments so as to extend in the circumferential direction, the coupling portion being of a shape projecting or recessed in the axial direction; and
   during the sintered body forming step, a powdered metal forming the green body is sintered to form a powdery metal sintered body having a shape corresponding to the axial flow compressor blade unit, thereby to form the axial flow compressor blade unit including the platform section and the airfoil section formed integrally with each other and having a powdered metal sintered structure,
   further comprising:
   a correcting step of correcting the airfoil shaped portion by pressing the airfoil shaped portion with the use of a press device;
   a hardening step of adjusting a structural morphology by implementing a heat treatment; and
   a finishing step of finishing the powdered metal sintered body to a predetermined shape and a dimensional accuracy by means of a mechanical processing wherein the powdered metal sintered structure of the airfoil section has a relative density of 95% or higher and an average crystalline particle size within the range of 10 to 100 μm.

2. The method of manufacturing the axial flow compressor blade unit as claimed in claim 1, wherein the axial flow compressor blade is a stator vane unit for a gas turbine.

3. The method of manufacturing the axial flow compressor blade unit as claimed in claim 1, wherein the green body forming step comprises:
   a material kneading step of kneading the powdered metal and a binder to provide a feedstock, in which the powdered metal versus a total amount of the binders is chosen to be 50 to 65 volume % versus 50 to 35 volume %; and waxes versus polymeric resins, both contained in the total amount of the binder, is chosen to be 40 to 65 volume % versus 60 to 35 volume %;
   an injection molding process of carrying out an injection molding, with the use of the feedstock obtained during the material kneading process, to provide the green body; and
   a degreasing process of removing the waxes of the binder with the use of a solvent which degreases only the waxes, the waxes consisting in the green body obtained during the injection molding process.

4. The method of manufacturing the axial flow compressor blade unit as claimed in claim 1, wherein at least one of a length and a width of each of the inner diametric surface segment and the outer diametric surface segment is set to be equal to or smaller than 50 mm.

* * * * *